(12) United States Patent
Matsunaga et al.

(10) Patent No.: US 9,450,698 B2
(45) Date of Patent: Sep. 20, 2016

(54) OPTICAL TRANSMISSION DEVICE, OPTICAL TRANSMISSION SYSTEM, AND OPTICAL TRANSMISSION METHOD

(71) Applicants: FUJITSU LIMITED, Kawasaki-shi, Kanagawa (JP); FUJITSU TELECOM NETWORKS LIMITED, Kawasaki-shi, Kanagawa (JP)

(72) Inventors: Koji Matsunaga, Munakata (JP); Tatsuya Toyozumi, Onojo (JP); Yasuo Tanaka, Fukuoka (JP); Yuichiro Sakane, Fukuoka (JP); Koji Bato, Kukuoka (JP); Wataru Kawasaki, Kawasaki (JP); Tatsuhiko Saito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 93 days.

(21) Appl. No.: 14/294,718

(22) Filed: Jun. 3, 2014

(65) Prior Publication Data

US 2014/0355976 A1 Dec. 4, 2014

(30) Foreign Application Priority Data

Jun. 4, 2013 (JP) .................. 2013-118310

(51) Int. Cl.
| | |
|---|---|
| H04B 10/03 | (2013.01) |
| H04J 14/02 | (2006.01) |
| H04B 10/079 | (2013.01) |
| H04Q 11/00 | (2006.01) |

(52) U.S. Cl.
CPC ........... *H04J 14/0221* (2013.01); *H04B 10/03* (2013.01); *H04B 10/07955* (2013.01); *H04J 14/0227* (2013.01); *H04J 14/0261* (2013.01); *H04Q 11/0066* (2013.01)

(58) Field of Classification Search
CPC ................ H04B 10/07; H04B 10/075; H04B 10/079–10/0799; H04L 43/0847
USPC .................................. 398/1–7, 17, 22, 23, 34
See application file for complete search history.

(56) References Cited

U.S. PATENT DOCUMENTS

| 5,539,564 A * | 7/1996 | Kumozaki ......... H04B 10/2503 398/136 |
|---|---|---|
| 6,426,817 B1 * | 7/2002 | Tomita ................. H04B 10/296 398/158 |
| 6,633,430 B1 * | 10/2003 | Monnard ........... H04B 10/2931 359/337.11 |
| 7,099,578 B1 * | 8/2006 | Gerstel ................ H04J 14/0295 370/216 |
| 7,233,738 B2 * | 6/2007 | Kerfoot, III .......... H04J 14/029 398/10 |
| 8,068,735 B2 * | 11/2011 | Stango ................ H04J 14/0217 359/334 |
| 2003/0170028 A1 * | 9/2003 | Mori .................. H04B 10/2537 398/79 |

(Continued)

FOREIGN PATENT DOCUMENTS

| JP | 11136187 A * | 5/1999 | ............. H04B 10/02 |
|---|---|---|---|
| JP | 2000-151607 | 5/2000 | |

*Primary Examiner* — Li Liu
(74) *Attorney, Agent, or Firm* — Staas & Halsey LLP

(57) ABSTRACT

The optical transmission device includes an N×N optical switch, an optical packet receiver and an optical packet generation unit. The N×N optical switch transmits data in which a plurality of optical signals each having a different wavelength is multiplexed. The optical packet receiver detects change in the number of wavelengths of optical signals constituting the data. The optical packet generation unit generates, when the change is detected by the optical packet receiver, data to be transmitted by the N×N optical switch, using optical signals for the number of wavelengths after the change.

6 Claims, 17 Drawing Sheets

(56) References Cited

U.S. PATENT DOCUMENTS

| | | | | |
|---|---|---|---|---|
| 2003/0223751 | A1* | 12/2003 | Shimizu | H04J 14/0221 398/79 |
| 2005/0185577 | A1 | 8/2005 | Sakamoto et al. | 370/218 |
| 2006/0045520 | A1* | 3/2006 | Nakano | H04B 10/506 398/33 |
| 2006/0127093 | A1* | 6/2006 | Park | H04J 14/0226 398/75 |
| 2006/0263089 | A1* | 11/2006 | Furst | H04B 10/296 398/79 |
| 2012/0201537 | A1* | 8/2012 | Uekama | H04L 45/62 398/51 |
| 2012/0201538 | A1* | 8/2012 | Uekama | H04L 45/62 398/51 |

* cited by examiner

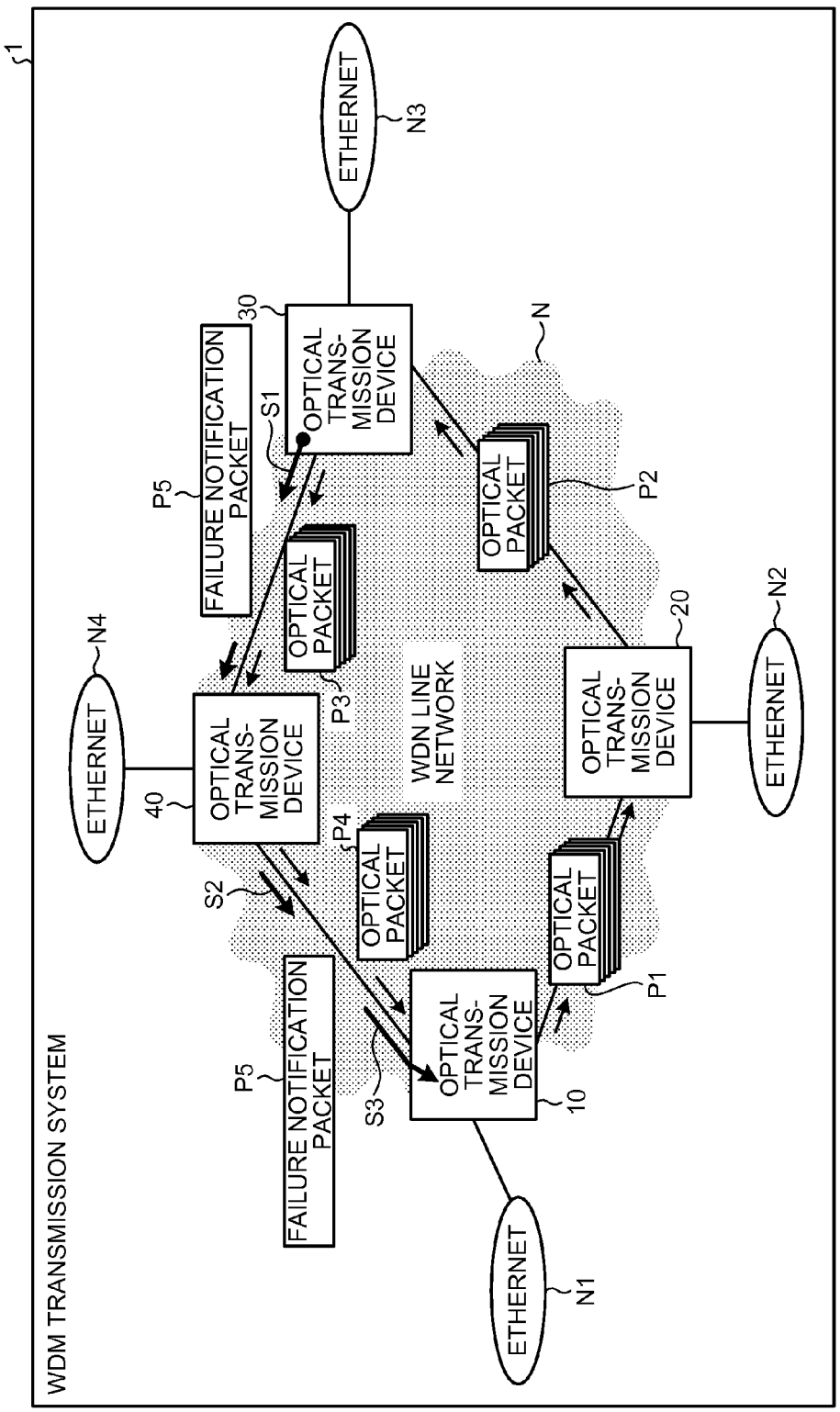

| DESTINATION NODE ID: 10 | TRANSMISSION SOURCE NODE ID: 30 | PACKET LENGTH: 20 BYTES | QoS CLASS: TOP PRIORITY | WAVELENGTH CONFIGURATION: M = 10 | SUB-POINTER: $\lambda 1$, t0 |

| PACKET LENGTH: 15 BYTES | FAILURE WAVELENGTH: $\lambda 1$ | FRAGMENT ID: P7 | FRAGMENT FLAG: 0 | FRAGMENT OFFSET: 1 |

OPTICAL TRANSMISSION DEVICE, OPTICAL TRANSMISSION SYSTEM, AND OPTICAL TRANSMISSION METHOD

CROSS-REFERENCE TO RELATED APPLICATION

This application is based upon and claims the benefit of priority of the prior Japanese Patent Application No. 2013-118310, filed on Jun. 4, 2013, the entire contents of which are incorporated herein by reference.

FIELD

The embodiments discussed herein are related to an optical transmission device, an optical transmission system, and an optical transmission method.

BACKGROUND

In a related optical signal transmission technology, a WDM (Wavelength Division Multiplex) system is utilized as a communication system in which a plurality of optical signals each having a different wavelength is multiplexed to one optical fiber cable. In an optical packet transmission system to which the WDM system is applied (hereinafter, described as a "WDM transmission system"), an optical packet transmission device temporarily converts a packet received from a client terminal via Ethernet (registered trademark) into an electrical signal, and then converts the electrical signal into an optical packet again to send out the converted optical packet to a WDM line as an optical transmission path. When sending out an optical packet, the optical packet transmission device divides the optical packet into a plurality of different wavelengths (for example, 10 wavelengths), and then multiplexes and transfers optical signals with the wavelengths. When an optical packet transmission device on a receiving side (hereinafter, described as an "optical packet receiving station") receives the optical packet, the optical packet receiving station divides the optical packet into a plurality of different wavelengths and restructures the optical packet from optical signals with the wavelengths, and thereafter transfers the optical packet to a client terminal via Ethernet.

Patent Document 1: Japanese Laid-open Patent Publication No. 2000-151607

However, when an optical packet transmission device divides an optical packet into a plurality of wavelengths $\lambda_0$ to $\lambda_{m-1}$ to be transferred, communication of the optical packet is cut off in some conditions. For example, when an E/O (Electrical to Optical) converter corresponding to wave length $\lambda_1$, among the components of the optical packet transmission device on a transmission side (hereinafter, described as an "optical packet transmitting station"), suffers from a failure due to some factor, transmission in a portion corresponding to wavelength $\lambda_1$, among the components of the optical packet in which the plurality of wavelengths is multiplexed, comes to be interrupted. However, the optical packet receiving station is unable to normally recover (re-structure) the packet to be transferred to Ethernet, unless an optical packet with all wavelengths used in the transmission (for example, 10 wavelengths) is received. For this reason, there has been a concern that in the WDM transmission system in which an optical packet transmitting station divides an optical packet into a plurality of wavelengths to be sent out, communication at and after the optical packet receiving station becomes difficult to be continued when the above-described failure occurred.

SUMMARY

According to an aspect of the embodiments, an optical transmission device includes: a transmission unit that transmits data including a plurality of optical signals each including a different wavelength, the plurality of optical signals being multiplexed; a detection unit that detects change in the number of wavelengths of optical signals constituting the data; and a generation unit that, when the change is detected by the detection unit, generates data to be transmitted by the transmission unit, using optical signals for the number of wavelengths after the change.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating a state where a failure in an optical transmission device on a transmission side is notified;

FIG. 11A is a diagram illustrating a data setting example in a main header of the failure notification packet;

FIG. 11B is a diagram illustrating a data setting example in a failure notification header of the failure notification packet;

DESCRIPTION OF EMBODIMENTS

Preferred embodiments will be explained with reference to accompanying drawings. It is noted that the optical transmission device, optical transmission system, and optical transmission method disclosed herein is not limited by the below-described embodiments.

[a] First Embodiment

Figure 1:
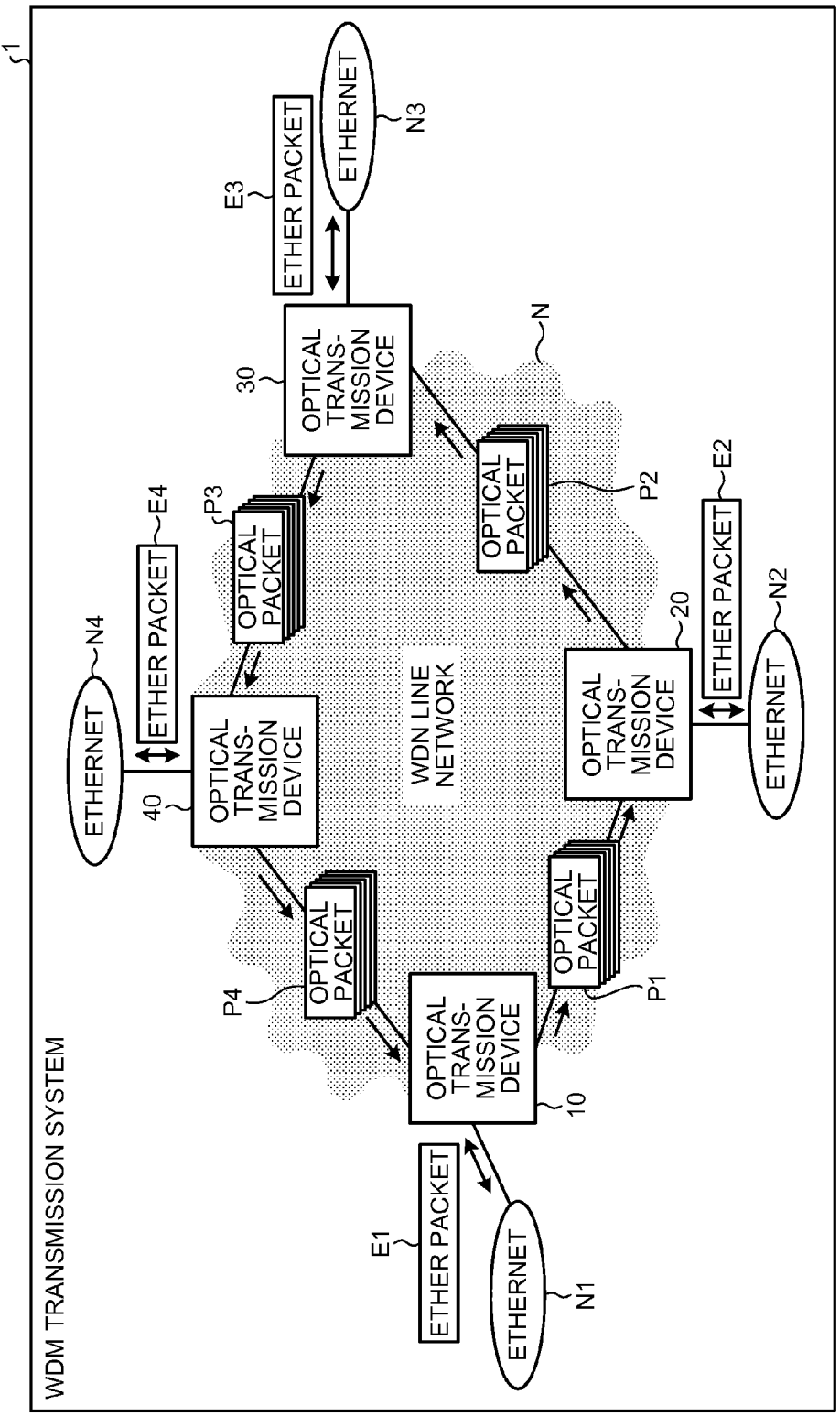
FIG. 1 is a diagram illustrating a configuration of a WDM transmission system.

First, a configuration of a WDM transmission system according to one embodiment disclosed herein will be described. FIG. 1 is a diagram illustrating a configuration of a WDM transmission system 1. As illustrated in FIG. 1, the WDM transmission system 1 includes optical transmission devices 10, 20, 30 and 40 which are line-connected to Ethernets N1, N2, N3 and N4 respectively. Each of the optical transmission devices 10, 20, 30 and 40 are disposed on a WDM line network N (a portion with dots) which is formed in a ring shape. The optical transmission devices 10, 20, 30 and 40 also transmit and receive Ether packets E1 to E4 to and from corresponding Ethernets N1 to N4 respectively via optical fiber cables. Furthermore, the optical transmission devices 10, 20, 30 and 40 transmit and receive optical packets P1 to P4 to and from the neighboring optical transmission devices 10, 20, 30 and 40 via optical fiber cables.

Among the optical transmission devices 10, 20, 30 and 40, the optical transmission device 10, for example, receives Ether packet E1 (for example, a 10 GbE optical signal) from a client terminal such as a PC (Personal Computer) via Ethernet N1. Thereafter, the optical transmission device 10 temporarily converts the Ether packet E1 to electrical signals, and then converts the electrical signals to the optical packet P1 again to be sent out to the WDM line as an optical transmission path. When sending out the optical packet P1, the optical transmission device 10 divides the optical packet P1 into a plurality of different wavelengths (for example, 10 wavelengths), and then multiplexes and transfers optical signals with the wavelengths. On the other hand, when receiving the optical packet P4, the optical transmission device 10 divides the optical packet P4 into a plurality of different wavelengths and restructures the optical packet P4 from optical signals with the wavelengths, and thereafter transfers the optical packet P4 to a destination client terminal via Ethernet N1.

Figure 2:
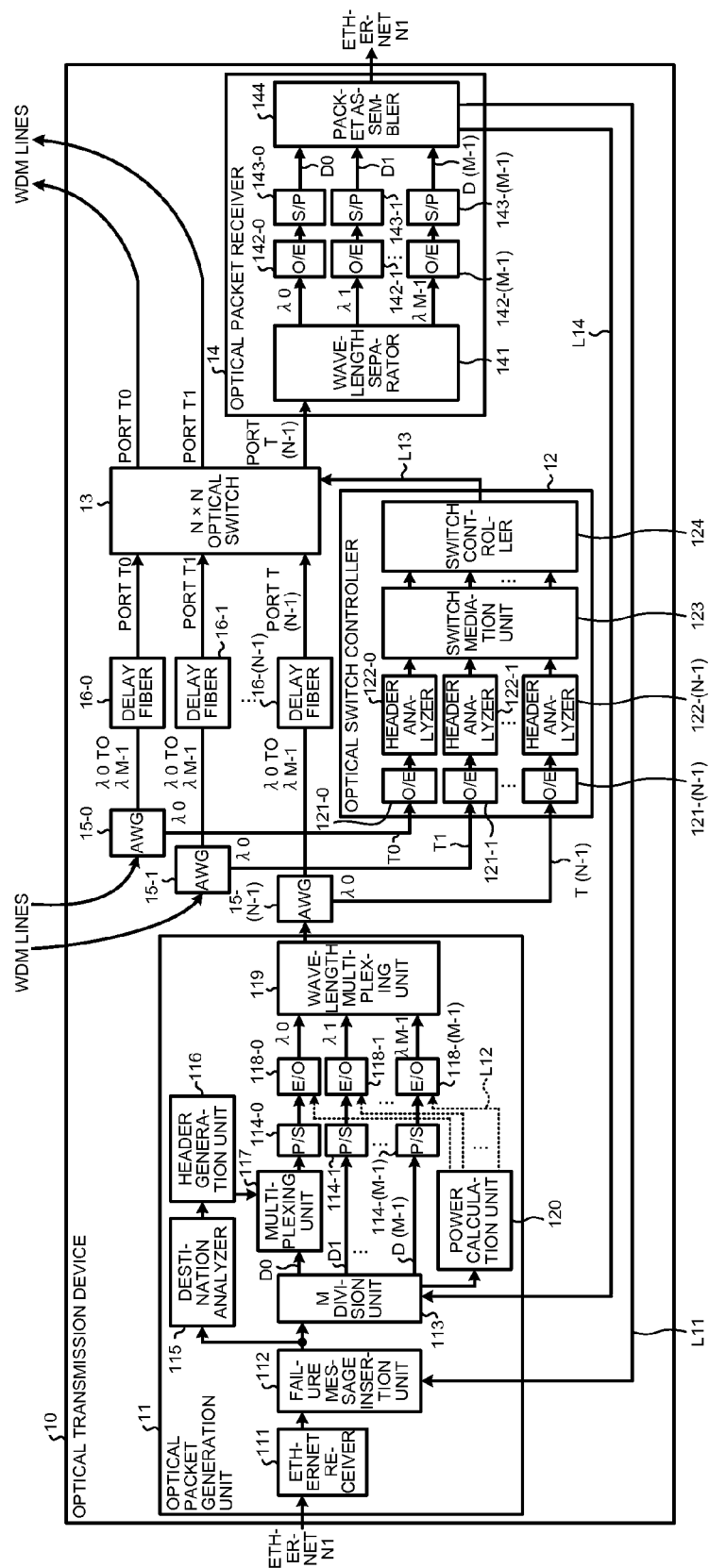
FIG. 2 is a diagram illustrating a configuration of an optical transmission device.

Next, a configuration of the optical transmission device 10 according to one embodiment disclosed herein will be described. FIG. 2 is a diagram illustrating a configuration of the optical transmission device 10. As illustrated in FIG. 2, the optical transmission device 10 includes an optical packet generation unit 11, an optical switch controller 12, an N×N optical switch 13 (N is a natural number), and an optical packet receiver 14. The optical transmission device 10 further includes N AWGs (Arrayed Waveguide Grating) 15-0, 15-1, . . . , and 15-(N−1), and N delay fibers 16-0, 16-1, . . . , and 16-(N−1) corresponding to the N AWGs respectively. These components are connected with each other so that unidirectional or bidirectional input and output of signals and data can be performed.

The optical packet generation unit 11 divides the Ether packet E1 received from Ethernet N1 into M pieces, and generates M pieces of data D0 to D(M−1) which are to be assembled to become the optical packet P1. Here, M is a natural number, for example, 10. In addition, the optical packet generation unit 11 analyzes a destination of the Ether packet E1, and generates a path information header of the optical packet P1. The path information header contains, for example, a packet length of the Ether packet E1, a destination node ID of the optical packet P1, and a transmission source node ID of the optical packet P1. The path information header is allocated only to $\lambda_0$ that is a top wavelength among wavelengths $\lambda_0$ to $\lambda_{M-1}$ corresponding to data D0, D1, . . . , and D(M−1) obtained by the above-described M division respectively. The optical packet generation unit 11 converts data D0, D1, . . . , and D(M−1) obtained by the above-described M division into optical signals with M wavelengths, and thereafter outputs the optical signals as the optical packet P1 to AWG 15-(N−1).

More specifically, the optical packet generation unit 11 includes an Ethernet receiver 111, a failure message insertion unit 112, an M division unit 113, P/Ss (Parallel to Serial) 114-0, 114-1, . . . , and 114-(M−1), a destination analyzer 115, a header generation unit 116, and a multiplexing unit 117. The optical packet generation unit 11 also includes E/Os (Electrical to Optical) 118-0, 118-1, . . . , and 118-(M−1), a wavelength multiplexing unit 119, and a power calculation unit 120. These components are connected with each other so that unidirectional or bidirectional input and output of signals and data can be performed.

The Ethernet receiver 111 includes an interface which receives a 10 GbE optical signal, and converts the optical signal received by the interface into an electrical signal. The failure message insertion unit 112 generates a failure notification packet when a failure of E/O in an optical packet generation unit of another optical transmission device is detected via a failure detection information notification line L11, and transmits the generated failure notification packet to the other optical transmission device. The M division unit 113 divides data input from the failure message insertion unit 112 described in the above paragraph into M pieces of data D0, D1, . . . , and D(M−1). In this case, M indicates the number of wavelengths multiplexed.

P/Ss 114-0, 114-1, . . . , and 114-(M−1) perform parallel-serial conversion of data D0, D1, . . . , and D(M−1) being subjected to the M division and input from the M division unit 113, at a speed of 1/16 of 10 GbE. The destination analyzer 115 analyzes a destination of the optical packet P1 from an electrical signal input from the failure message insertion unit 112. The header generation unit 116 generates the above-described path information header of the optical packet P1 based on the above-described destination analysis result by the destination analyzer 115. The multiplexing unit 117 allocates the path information header generated by the header generation unit 116 to the top data D0 among the above-described data subjected to the M division.

E/Os 118-0, 118-1, . . . , and 118-(M−1) convert electrical signals which have been converted into serial signals by P/Ss 114-0, 114-1, . . . , and 114-(M−1) respectively into optical signals at a speed of 10 GbE. When the wavelength multiplexing unit 119 receives the optical signals from E/Os 118-0, 118-1, . . . , and 118-(M−1), it wavelength-multiplexes M optical signals having separate wavelengths $\lambda_0$ to $\lambda_{M-1}$. The power calculation unit 120 calculates an optical output power B of each wavelength so that an optical output power A after lack of an wavelength becomes equal to an optical output power Z before the lack of the wavelength, and adjusts an optical output power from each of E/Os 118-0, 118-1, . . . , and 118-(M−1) based on the calculated result. The adjustment of the optical output power is performed by a transmission power control signal L12 output from the power calculation unit 120 to each of E/Os 118-0, 118-1, . . . , and 118-(M−1).

The optical switch controller 12 receives an optical packet (for example, optical packets P1 to P4) from each of AWGs 15-0, 15-1, . . . , and 15-(N−1). The optical switch controller 12 performs, for example, photoelectric conversion of the optical packet P1 in response to input of the optical packet P1, and analyzes the above-described path information header. The optical switch controller 12 mediates optical packets input from N ports T0, T1, . . . , and T(N−1) based on the analyzed result, and generates a switch control signal L13 (on/off signal) corresponding to the destination of the optical packet for the N×N optical switch 13. The optical switch controller 12 outputs the generated switch control signal L13 to the N×N optical switch 13 of the subsequent stage. In the mediation, for example, the optical switch controller 12 preferentially obtains the first-arriving optical packet among a plurality of optical packets (for example, optical packets P1 to P4) arriving from N ports T0, T1, . . . , and T(N−1), and discards the subsequently arriving optical packets. The above-described switch control signal L13 has a pulse width corresponding to a packet length of the optical packet P1.

More specifically, the optical switch controller 12 includes O/Es (Optical to Electrical) 121-0, 121-1, . . . , and 121-(N−1), header analyzers 122-0, 122-1, . . . , and 122-(N−1), a switch mediation unit 123, and a switch controller 124. These components are connected with each other so that unidirectional or bidirectional input and output of signals and data can be performed.

Each of O/Es (Optical to Electrical) 121-0, 121-1, . . . , and 121-(N−1) converts an optical signal of wavelength 2 input from the corresponding AWG 15-0, 15-1, . . . , or 15-(N−1) through port T0, T1, . . . , or T(N−1) into an electrical signal. Each of the header analyzers 122-0, 122-1, . . . , 122-(N−1) analyzes (performs routing of) a path of the optical packet based on the above-described electrical signal, and outputs the analyzed result to the switch mediation unit 123. The switch mediation unit 123 performs mediation of optical packets by obtaining or discarding each of N electrical signals input from the header analyzers 122-0, 122-1, . . . , and 122-(N−1) in accordance with the arriving order thereof. The switch controller 124 controls switching of on/off for the N×N optical switch 13 of the subsequent stage, using the switch control signal L13, according to the mediation result by the switch mediation unit 123.

The N×N optical switch 13 includes a semiconductor optical amplifier (SOA). The N×N optical switch 13 turns on the SOA corresponding to each route of ports T0, T1, . . . , and T(N−1), according to the switch control signal L13 input from the optical switch controller 12, in order to output an optical packet (for example, optical packets P1 to P4) to the corresponding port T0, T1, . . . , or T(N−1).

When receiving the optical packet P1 from port T(N−1), the optical packet receiver 14 separates multiplexed M optical signals, and converts each of the optical signals into an electrical signal. After performing serial/parallel conversion of each electrical signal obtained by the conversion, the optical packet receiver 14 assembles one Ether packet E1 thereby to recover the original Ether packet. The optical packet receiver 14 outputs the recovered Ether packet E1 to Ethernet N1.

More specifically, the optical packet receiver 14 includes a wavelength separator 141, O/Es 142-0, 142-1, . . . , and 142-(M−1), S/Ps (Serial to Parallel) 143-0, 143-1, . . . , and 143-(M−1), and a packet assembler 144. These components are connected with each other so that unidirectional or bidirectional input and output of signals and data can be performed.

The wavelength separator 141 receives an optical signal switched to a route other than the WDM line among the optical signals switched at the N×N optical switch 13, and separates the signal into a plurality of different wavelengths $\lambda_0$ to $\lambda_{M-1}$ to be output. O/Es 142-0, 142-1, . . . , and 142-(M−1) convert optical signals with wavelengths $\lambda_0$ to $\lambda_{M-1}$ received from the wavelength separator 141 into M electrical signals. S/Ps 143-0, 143-1, . . . , and 143-(M−1) perform serial-parallel conversion of the M electrical signals input from the corresponding S/Ps 143-0, 143-1, . . . , and 143-(M−1) at a speed of 1/16 of 10 GbE. The packet assembler 144 assembles an Ether packet E1 from M pieces of data D0, D1, . . . , and D(M−1) obtained as a result of the serial-parallel conversion, and sends out the packet to Ethernet N1. Also, when the packet assembler 144 detects a failure in O/Es 142-0, 142-1, . . . , or 142-(M−1) corresponding to any wavelength among the wavelengths $\lambda_0$ to $\lambda_{M-1}$, it outputs information that notifies of the failure as failure information to the M division unit 113 of the optical packet generation unit 11. Input and output of the failure information are performed through a failure information notification line L14.

AWGs 15-0, 15-1, . . . , and 15-(N−1) each include an optical multiplexer/demultiplexer. Each of AWGs 15-0, 15-1, . . . , and 15-(N−1) extracts an optical signal corresponding to data to which the path information header is allocated, from wavelength-multiplexed signals received from the optical packet generation unit 11 and the WDM line, and outputs the extracted optical signal to the optical switch controller 12. For example, each of AWGs 15-0, 15-1, . . . , and 15-(N−1) separates only an optical signal of wavelength $\lambda_0$ of the path information header, among the optical signals of the wavelengths $\lambda_0$ to $\lambda_{M-1}$ which were wavelength-multiplexed in the optical packet generation unit 11.

The delay fibers 16-0, 16-1, . . . , and 16-(N−1) are disposed so as to correspond to AWGs 15-0, 15-1, . . . , and 15-(N−1) respectively on the main signal line of the optical packet (for example, optical packets P1 to P4). That is, each of the delay fibers 16-0, 16-1, . . . , and 16-(N−1) is inserted between each of the AWGs 15-0, 15-1, . . . , and 15-(N−1) and the N×N optical switch 13, and provides a delay corresponding to a time comparable to a processing time in the optical switch controller 12 for each of wavelengths $\lambda_0$ to $\lambda_{M-1}$. Accordingly, the delay fibers 16-0, 16-1, . . . , and 16-(N−1) enable a coincidence between a timing when the above-described optical packet arrives at the N×N optical switch 13, and a timing when the switch control signal L13 arrives at the N×N optical switch 13.

Although the configuration of the optical transmission device 10 has been exemplarily described above, a configuration of each of the optical transmission devices 20, 30, and 40 is similar to the configuration of the optical transmission device 10. Therefore, the same reference sign is used at the end of the sign for a common constituent part, and illustration and detailed description thereof are omitted.

Figure 3:
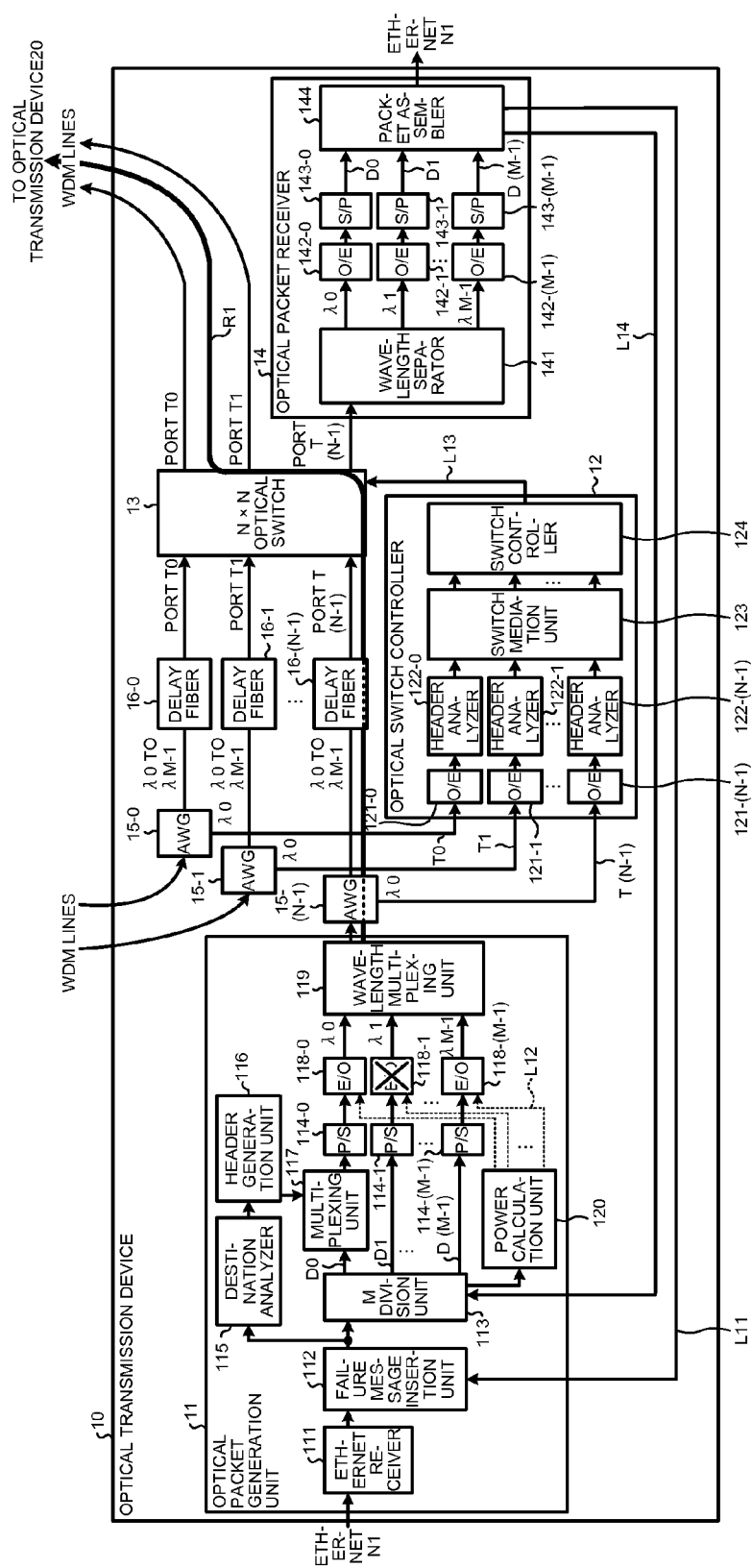
FIG. 3 is a diagram illustrating an optical transmission device when a failure occurred in E/O of wavelength $\lambda_1$ in a first embodiment.

Next, operation will be described. The present description regarding operation is based on an assumption that while the optical transmission device 10 was transmitting the optical packet P1 to the optical transmission device 30, a failure occurred in the optical packet generation unit 11 of the optical transmission device 10. FIG. 3 is a diagram illustrating an optical transmission device when a failure occurred in E/O 118-1 for wavelength $\lambda_1$ in a first embodiment. As illustrated in a packet path R1 of FIG. 3, the optical packet generation unit 11 of the optical transmission device 10 sends out the optical packet P1 destined for the optical transmission device 30 through the AWG 15-(N−1), the delay fibers 16-(N−1) and the N×N optical switch 13. The optical packet P1 arrives at the optical transmission device 30 that is a destination node, through the WDM line and the optical transmission device 20 (see FIG. 1).

Figure 4:
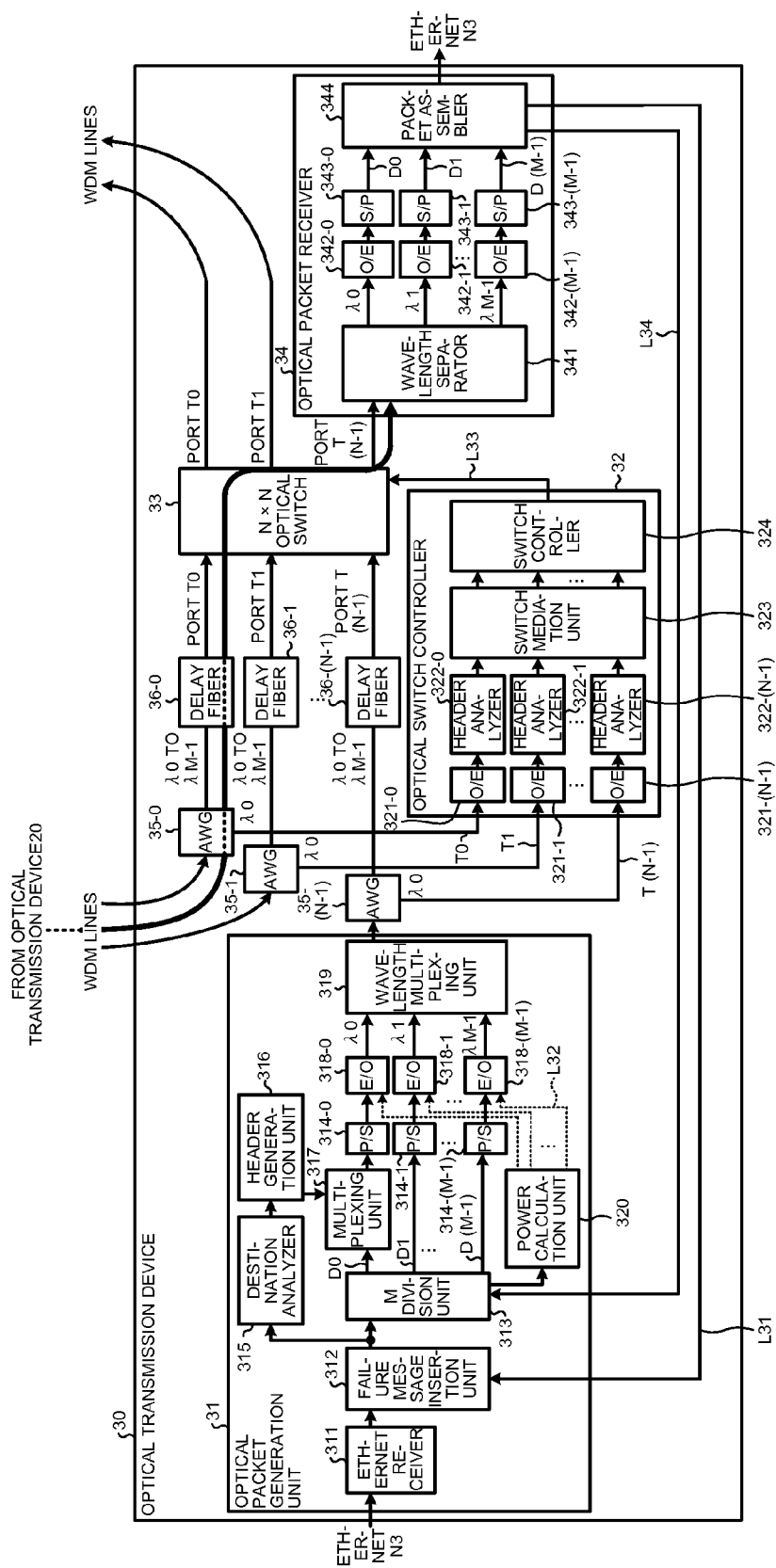
FIG. 4 is a diagram illustrating an optical transmission device at which an optical packet lacking an optical signal of wavelength $\lambda_1$ arrived.

FIG. 4 is a diagram illustrating an optical transmission device at which an optical packet lacking an optical signal with wavelength $\lambda_1$ arrived. As illustrated in the packet path R1 of FIG. 4, an optical packet receiver 34 of the optical transmission device 30 receives the optical packet P1 transmitted from the optical transmission device 10 as a transmission source through the AWG 35-0, a delay fibers 36-0 and an N×N optical switch 33. After the reception, the optical packet receiver 34 temporarily separates the optical packet P1, and a packet assembler 344 attempts to assemble the Ether packet E3. However, due to a failure of E/O 118-1 in the above-described optical transmission device 10, the optical packet P1 lacks an optical signal with wavelength $\lambda_1$. For this reason, it is difficult for the optical transmission device 30 to reconstruct the packet in spite of having received the optical packet P1.

The packet assembler 344 of the optical transmission device 30 detects the failure in the transmission source of the optical packet P1 based on the fact that the optical packet P1 lacks the optical signal with wavelength $\lambda_1$. At the same time, the packet assembler 344 refers to the path information header of the optical packet P1 to specify that the above-described failure occurred in the optical transmission device 10. Thereafter, the packet assembler 344 notifies a failure message insertion unit 312 of the occurrence of the failure in wavelength $\lambda_1$ of the optical transmission device 10, through a failure detection information notification line L31. The notified failure message insertion unit 312 generates a failure notification packet, and sends the packet to the optical transmission device 10.

Figure 5A:
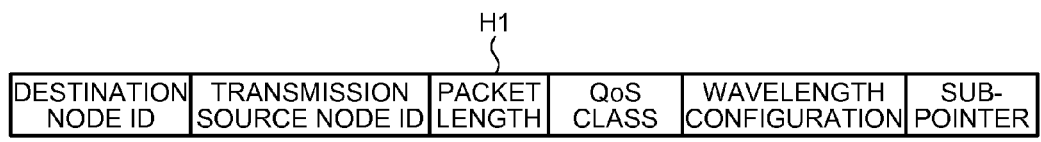
FIG. 5A is a diagram illustrating a configuration example of a main header of an optical packet.

Next, a format of the optical packet P1 according to the present embodiment will be described. FIG. 5A is a diagram illustrating a configuration example of a main header H1 of the optical packet P1. As illustrated in FIG. 5A, the main header H1 includes a region that stores each of a destination node ID, a transmission source node ID, a packet length, a QoS (Quality of Service) class, a wavelength configuration and a sub-pointer. The destination node ID is identification information of an optical transmission device (for example, the optical transmission device 30) that becomes a destination node of the optical packet P1. The transmission source node ID is identification information of an optical transmission device (for example, the optical transmission device 10) that is the transmission source node of the optical packet P1.

The packet length indicates a length of the optical packet P1 (for example, the number of time slots and the number of bits). Here, in the storage region of the packet length, information indicating a length of a separate packet (for example, a failure notification packet) contained in the optical packet P1 may be stored in addition to the information indicating the length of the whole optical packet P1.

The QoS class is information indicating processing priority for the optical packet P1. This information is referred to during congestion of optical packets. The higher the value of the QoS class is, the higher the priority in each optical transmission device is. In the region for the wavelength configuration, information indicating, for example, the number of wavelengths and a value and property for each wavelength is stored as a group of wavelengths of optical signals constituting the optical packet P1. The group of wavelengths is stored, for example, in a bitmap format of M bits. The sub-point is information indicating a position where the above-described failure notification packet is stored in the optical packet P1. This information is used when each optical transmission device transmits the above-described failure notification packet by utilizing a vacant region of a normal optical packet. For example, when "$\lambda_4$" and "t8" are stored as a sub-point of the optical packet P1, the top of the failure notification packet stored comes to be a resource having an optical wavelength of "$\lambda_4$" and a time slot of "t8", among resources constituting the optical packet P1.

Figure 5B:
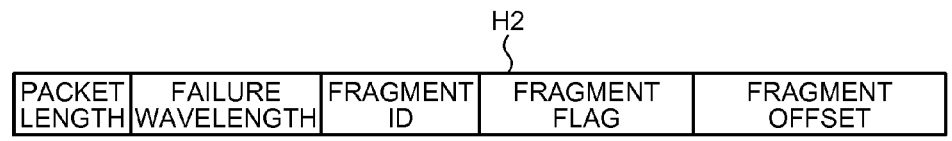
FIG. 5B is a diagram illustrating a configuration example of a failure notification header of a failure notification packet.

The optical packet P1 may include a failure notification header as a subheader for the failure notification packet, other than the above-described main header. The failure notification header is followed by a failure message as payload data. FIG. 5B is a diagram illustrating a configuration example of a failure notification header H2 of a failure notification packet P5. As illustrated in FIG. 5B, the failure notification header H2 includes a region that stores each of a packet length, a failure wavelength, a fragment ID, a fragment flag and a fragment offset. The packet length indicates a length of the failure notification packet P5 (for example, the number of time slots and the number of bits). In the region of the failure wavelength, information indicating a wavelength in which abnormality occurred is stored. This information is stored, for example, in a bitmap format of n bits (n is a natural number), and n=3 indicates that abnormality occurred in an optical signal with wavelength $\lambda_3$.

The fragment ID is identification information of the failure notification packet P5. In this case, when the whole failure notification packet P5 is not housed in one optical packet, the failure notification packet P5 comes to be stored (fragmented) in vacant regions of a plurality of optical packets. Even in such a case, the same fragment ID is assigned to each of the constituent parts of the failure notification packet P5. The fragment flag is information indicating whether or not a subsequent fragment packet exists. For example, "0" set as the fragment flag of the failure notification packet P5 indicates that the failure notification packet P5 is a final packet. On the other hand, "1" set as the fragment flag of the failure notification packet P5 indicates that the failure notification packet P5 is followed by a fragment packet. Furthermore, the fragment offset is information indicating where a fragmented packet is in the order when the failure notification packet P5 is fragmented. For example, a failure notification packet having a fragment flag of "0" and a fragment offset of "3" is a rearmost packet among the fragment packets which exist in a total amount of three.

Next, a method of notifying a failure will be described. FIG. 6 is a diagram illustrating a state where a failure in an optical transmission device 10 on a transmission side is notified. As illustrated in FIG. 6, the optical transmission device 30 which detected abnormality in an input signal identifies a transmission source node (the optical transmission device 10) from a path information header of an optical packet P1, and transmits a failure notification packet P5 to the identified node (S1). When an optical transmission device 40 receives the failure notification packet P5 from the optical transmission device 30, it transfers the failure notification packet P5 to the optical transmission device 10 (S2). In the optical transmission device 10 which received the failure notification packet P5, the packet assembler 144 refers to a failure wavelength and the like in the failure notification packet P5, to recognize abnormality of wavelength $\lambda_1$ (S3). Here, the failure notification packet P5 may be transmitted and received through the optical transmission device 20.

A format of the failure notification packet P5, which is transmitted from the optical transmission device 30 to the optical transmission device 10, will be described below. The format of the failure notification packet P5 has two patterns depending on whether or not a normal optical packet (for example, an optical packet P3) transmitted from the optical transmission device 30 to the optical transmission device 10 exists. Therefore, the format of the failure notification packet P5 will be described for each of the cases where the normal optical packet P3 exists and does not exist.

Figure 7A:
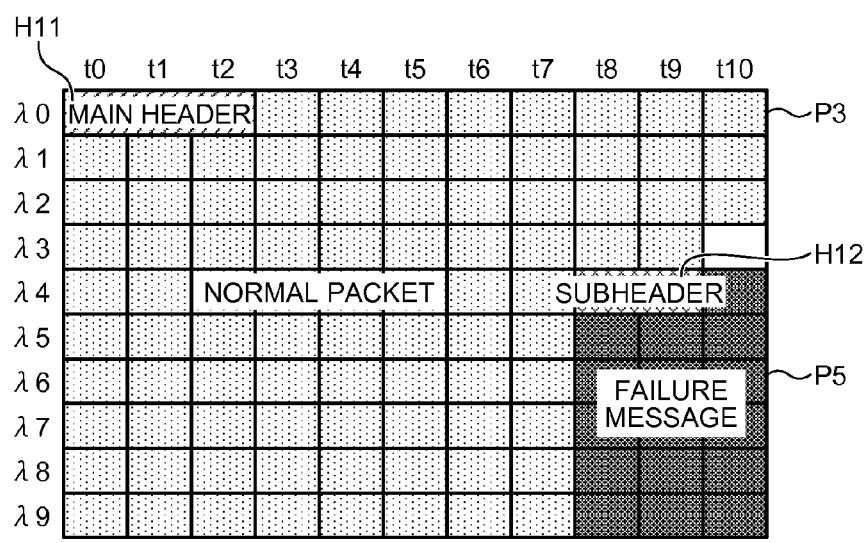
FIG. 7A is a diagram illustrating a format of the failure notification packet when a normal optical packet exists.

FIG. 7A is a diagram illustrating the format of the failure notification packet P5 in a case where a normal optical packet P3 exists. As illustrated in FIG. 7A, the optical packet P3 includes 10 wavelengths of optical wavelengths $\lambda_0$ to $\lambda_9$ and 11 slots of time slots t0 to t10. The failure notification packet P5 is stored in a region (a vacant region) other than the region where a main header H11 of the optical packet P3 and the normal packet (a portion with dots in the drawing) are stored. Accordingly, with transmission of the optical packet P3, the failure notification packet P5 which is contained in the packet is transmitted from the optical transmission device 30 to the optical transmission device 10. Here, a blank of the FIG. 7A indicates the vacant region.

Figure 7B:
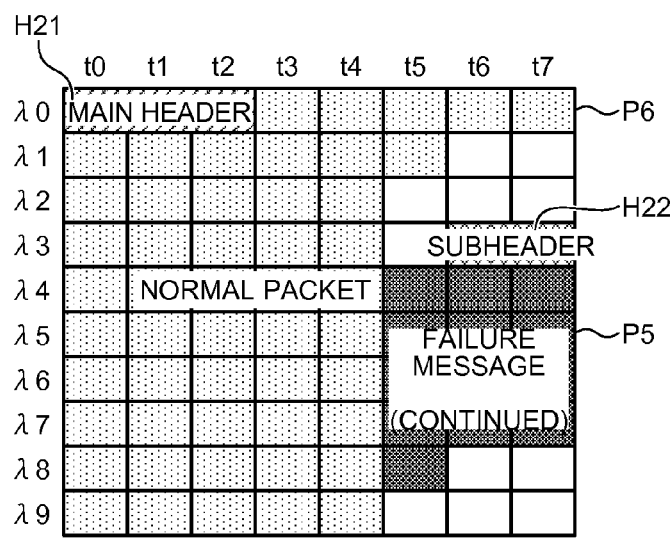
FIG. 7B is a diagram illustrating a format of the remaining failure notification packet when a normal optical packet exists.

In a case where the failure message in the failure notification packet P5 is not fit into the above-described vacant region, the failure notification packet P5 is further fragmented into another optical packet P6. FIG. 7B is a diagram illustrating a format of the remaining failure notification packet P5 when the normal optical packet P3 exists. As illustrated in FIG. 7B, the optical packet P6 includes 10 wavelengths of optical wavelengths $\lambda_0$ to $\lambda_9$ and eight slots of time slots t0 to t7. The remaining part of the failure notification packet P5 is stored in a region (a vacant region) other than the region where a main header H21 of the optical packet P6 and the normal packet (a portion with dots in the drawing) are stored. Accordingly, with transmission of the optical packets P3 and P6, the whole failure notification packet P5 comes to be transmitted from the optical transmission device 30 to the optical transmission device 10. Here, blanks of the FIG. 7B indicate the vacant region.

Figure 8A:
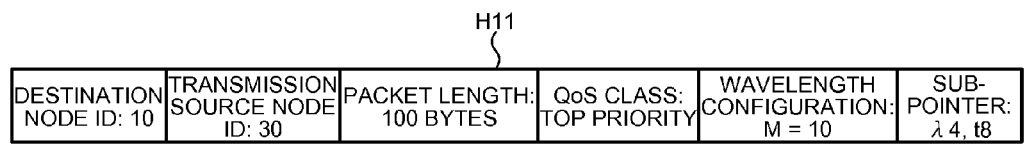
FIG. 8A is a diagram illustrating a data setting example in a main header of a first optical packet.

FIG. 8A is a diagram illustrating a data setting example in the main header H11 of the first optical packet P3. As illustrated in FIG. 8A, in the main header H11, the "optical transmission device 10" is set as the "destination node ID", and the "optical transmission device 30" is set as the "transmission source node ID". In addition, "100 bytes", for example, is set as the "packet length", and "top priority" during congestion is set as the "QoS class". Furthermore, "M=10", which indicates that optical signals for 10 wavelengths are multiplexed into the optical packet P3, is set as the "wavelength configuration", and "$\lambda_4$, t8", which indicates a start position of the failure notification packet P5 in the optical packet P3, is set as the "sub-pointer". Accordingly, the optical transmission device 10 can quickly detect occurrence of a failure in its own device, even when the normal optical packet P3 is received.

Figure 8B:
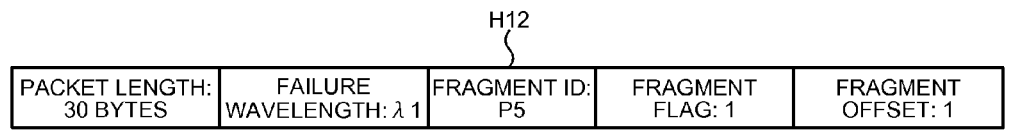
FIG. 8B is a diagram illustrating a data setting example in a failure notification header of the first optical packet.

FIG. 8B is a diagram illustrating a data setting example in the failure notification header H12 of the first optical packet P3. As illustrated in FIG. 8B, in the failure notification header H12, "30 bytes", for example, is set as the "packet length", and "$\lambda_1$", for example, is set as the "failure wavelength". Also, the "failure notification packet P5" having the failure notification header H12 is set as the "fragment ID". Furthermore, "1", which indicates that the failure notification packet P5 follows, is set as the "fragment flag", and a value "1", which indicates a top fragment, is set as the "fragment offset". Here, in a "failure message" storage region subsequent to the failure notification header H12, a message, for example, "An optical signal with wavelength $\lambda_1$ is abnormal" is set. Accordingly, the optical transmission device 10 can easily identify an occurrence location of a failure in its own device, even when the normal optical packet P3 is received.

Figure 9A:
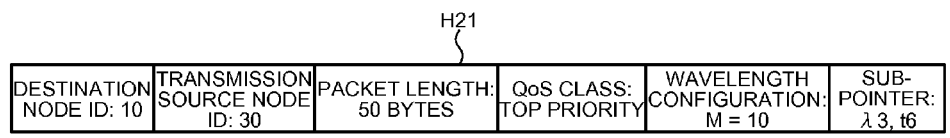
FIG. 9A is a diagram illustrating a data setting example in a main header of a subsequent optical packet.

FIG. 9A is a diagram illustrating a data setting example in the main header H21 of the subsequent optical packet P6. As illustrated in FIG. 9A, in the main header H21, similarly to the main header H11, the "optical transmission device 10" is set as the "destination node ID", and the "optical transmission device 30" is set as the "transmission source node ID". In addition, "50 bytes", for example, is set as the "packet length", and "top priority" during congestion is set as the "QoS class". Furthermore, "M=10", which indicates that optical signals for 10 wavelengths are multiplexed into the optical packet P6, is set as the "wavelength configuration", and "$\lambda_3$, t6", which indicates a start position of the failure notification packet P5 in the optical packet P6, is set as the "sub-pointer". Accordingly, the optical transmission device 10 can quickly detect occurrence of a failure in its own device, even when the normal optical packet P6 which follows the optical packet P3 is received.

Figure 9B:
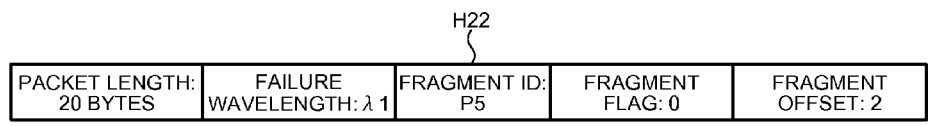
FIG. 9B is a diagram illustrating a data setting example in a failure notification header of the subsequent optical packet.

FIG. 9B is a diagram illustrating a data setting example in a failure notification header H22 of the subsequent optical packet P6. As illustrated in FIG. 9B, in the failure notification header H22, similarly to the failure notification header H12, "20 bytes", for example, is set as the "packet length", and "$\lambda_1$", for example, is set as the "failure wavelength". Also, the "failure notification packet P5" having the failure notification header H22 is set as the "fragment ID". Furthermore, "0", which indicates that the subsequent packet does not exist, is set as the "fragment flag", and a value "2", which indicates a second fragment, is set as the "fragment offset". Here, in a "failure message" storage region subsequent to the failure notification header H22, a warning message, for example, "Please change a configuration of wavelengths" is set. Accordingly, the optical transmission device 10 can easily identify an occurrence location of a failure in its own device, even when the normal optical packet P6 subsequent to the optical packet P3 is received. In addition, the optical transmission device 10 can simply and quickly recognize that the wavelengths need to be restructured prior to transmission of the optical packet.

Figure 10:
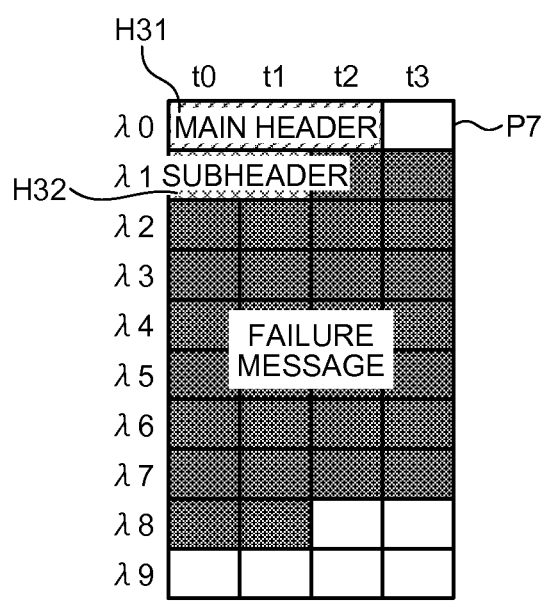
FIG. 10 is a diagram illustrating a format of a failure notification packet when there is no normal optical packet.

The optical transmission device 30 is able to transmit a failure notification packet P7 as a main packet to the optical transmission device 10 so as to notify of failure occurrence even when there is no packet communication between the optical transmission devices 30 and 10. FIG. 10 is a diagram illustrating a format of the failure notification packet P7 when there is no normal optical packet. As illustrated in FIG. 10, the failure notification packet P7 includes 10 wavelengths of optical wavelengths $\lambda_0$ to $\lambda_9$ and 4 slots of time slots t0 to t3. The failure notification packet P7 has both a main header H31 and a failure notification header H32. Accordingly, the optical transmission device 30 is individually able to transmit the failure notification packet P7 to the optical transmission device 10. Here, blanks in the FIG. 10 indicate the vacant region.

FIG. 11A is a diagram illustrating a data setting example in the main header H31 of the failure notification packet P7. As illustrated in FIG. 11A, in the main header H31, the "optical transmission device 10" is set as the "destination node ID", and the "optical transmission device 30" is set as the "transmission source node ID". In addition, "20 bytes", for example, is set as the "packet length", and "top priority" during congestion is set as the "QoS class". Furthermore, "M=10", which indicates that optical signals for 10 wavelengths are multiplexed into the failure notification packet P7, is set as the "wavelength configuration", and "$\lambda_1$, t0", which indicates a start position of the failure notification packet P7, is set as the "sub-pointer". Accordingly, the optical transmission device 10 can quickly detect occurrence of a failure in its own device, even when the failure notification packet P7 is independently received.

FIG. 11B is a diagram illustrating a data setting example in the failure notification header H32 of the failure notification packet P7. As illustrated in FIG. 11B, in the failure notification header H32, "15 bytes", for example, is set as the "packet length", and "$\lambda_1$", for example, is set as the "failure wavelength". Also, the "failure notification packet P7" having the failure notification header H32 is set as the "fragment ID". Furthermore, "0", which indicates that a subsequent fragment packet does not exist, is set as the "fragment flag", and a value "1", which indicates a top fragment, is set as the "fragment offset". Here, in a "failure message" storage region subsequent to the failure notification header H32, a message, for example, "An optical signal with wavelength $\lambda_1$ is abnormal. Please change a configuration of wavelengths." is set. Accordingly, the optical transmission device 10 can easily identify an occurrence location of a failure in its own device, even when the failure notification packet P7 is independently received.

Figure 12:
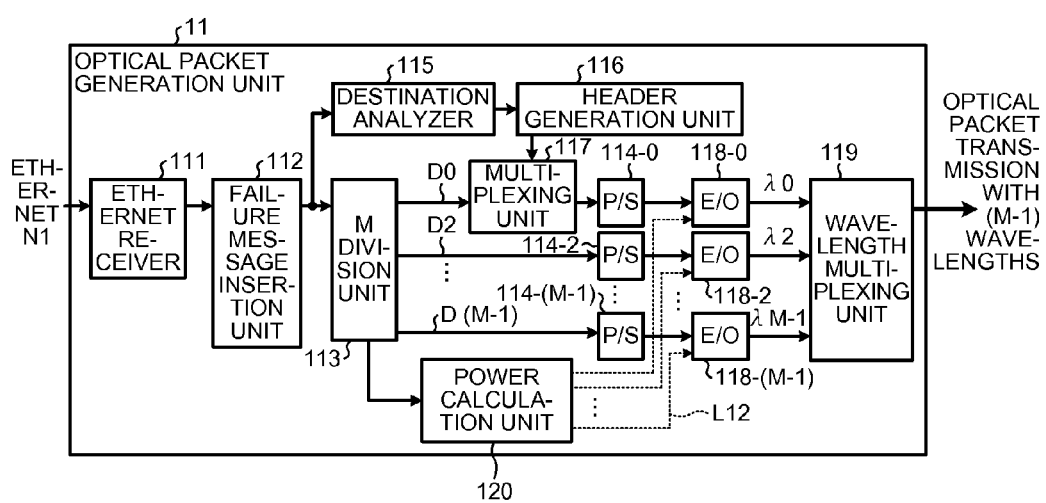
FIG. 12 is a diagram for explaining operation of an optical packet generation unit after detection of a failure in E/O of optical wavelength $\lambda_1$ in the first embodiment.

Next, operation of the optical transmission device 10 after detection of a failure will be described. FIG. 12 is a diagram for explaining operation of the optical packet generation unit 11 after detection of a failure in E/O 118-1 of optical wavelength $\lambda_1$ in the first embodiment. When the optical transmission device 10 receives a failure notification packet from the optical transmission device 30, the packet assembler 144 of the optical packet receiver 14 notifies the M division unit 113 in the optical packet generation unit 11 of abnormality in optical wavelength $\lambda_1$ through the failure information notification line L14. The notified M division unit 113 generates an optical packet with wavelengths remained after abnormal wavelength ($\lambda_1$ in the present embodiment) is removed, according to information of the above-described failure notification packet. That is, the M division unit 113 restructures the optical packet with optical signals with optical wavelengths $\lambda_0$, and $\lambda_2$ to $\lambda_{M-1}$ except for optical wavelength $\lambda_1$ in response to the above-described notification. Accordingly, the packet which was divided into M wavelengths to be transmitted comes to be divided into M−1 wavelengths to be transmitted.

Here, when the optical packet generation unit 11 of the optical transmission device 10 changes the number of wavelengths to be used in optical transmission, an optical output power after wavelength multiplex by the wavelength multiplexing unit 119 changes. In the present embodiment, the optical transmission device 10 reduces the number of wavelengths with occurrence of a failure, resulting in a reduction in the optical output power after the wavelength multiplex. Since the change in the optical output power becomes a factor of a packet error, it is concerned that reliability of the WDM transmission system 1 is reduced with the decrease in the number of wavelengths.

To address this concern, the optical packet generation unit 11 of the optical transmission device 10 adjusts the optical output power in accordance with the number of wavelengths after the change. Specifically, at a timing of the change in the number of wavelengths used, the M division unit 113 notifies the power calculation unit 120 of the changed number of wavelengths. The notified power calculation unit 120 calculates an optical output power B for each of the wavelengths so that an optical output power A lacking one wavelength becomes equal to an optical output power Z before the lack of the wavelength, and adjusts an optical output power from each of E/Os 118-0, 118-1, . . . , and 118-(M−1) based on the calculated results. The adjustment of an optical output power is performed by the transmission power control signal L12 output from the power calculation unit 120 to each of E/Os 118-0, 118-2, . . . , and 118-(M−1).

A total optical output power value Z when Y wavelengths of light are multiplexed wherein an optical output power of one wavelength is X may be represented by Mathematical Formula (1). In Mathematical Formula (1), X is an optical output power (unit is dBm) for each wavelength; Y is the number of wavelengths; and Z is a total optical output power (unit is dBm).

$$Z = X + 10 \log Y \tag{1}$$

Therefore, the total optical output power Z of the optical transmission device 10 before occurrence of a failure can be expressed by Z=X+10 log M using the optical output power X for each wavelength and the number of wavelengths M. On the other hand, the total optical output power A of the optical transmission device 10 after the occurrence of a failure can be expressed by A=B+10 log (M−1) using the optical output power B for each wavelength and the number of wavelengths (M−1). Therefore, the optical packet generation unit 11 adjusts the optical output power value for each of wavelengths $\lambda_0$, and $\lambda_2$ to $\lambda_{M-1}$, to a value (B) that allows the total optical output powers Z and A before and after the failure to become identical. Thus, the total optical output power can be maintained at the same value regardless of whether before and after occurrence of a failure.

First Variation

Figure 13:
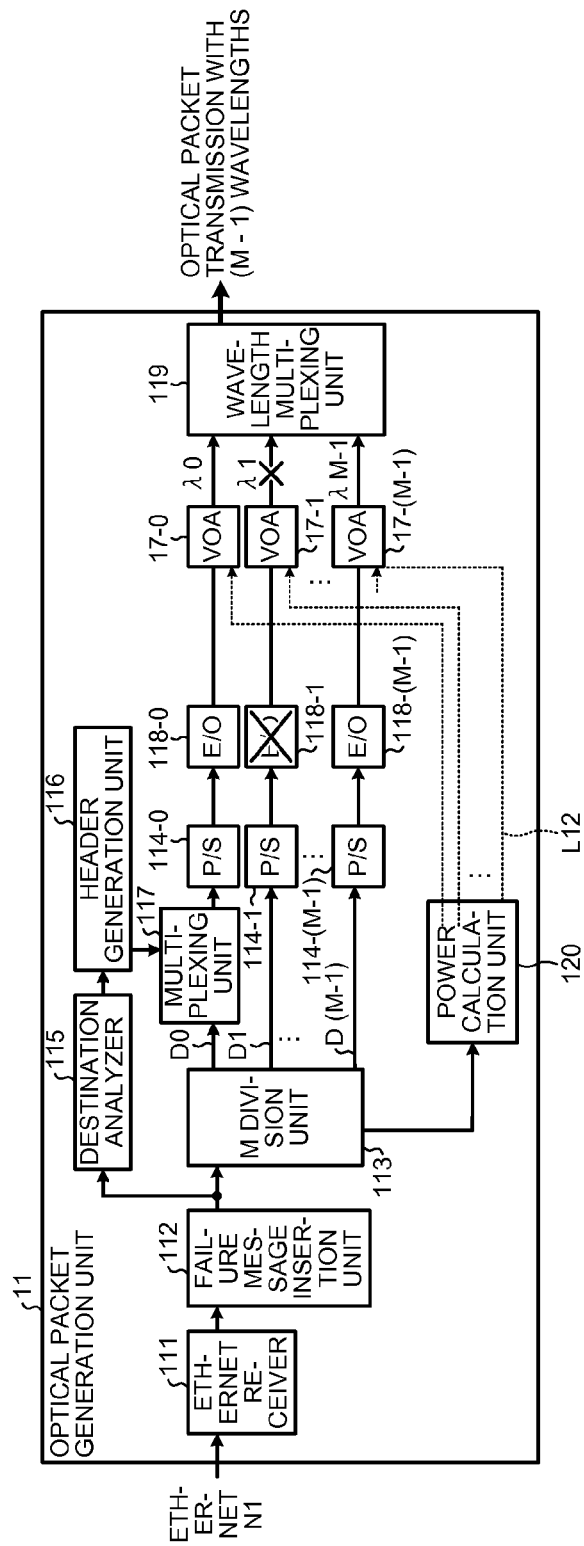
FIG. 13 is a diagram for explaining operation of an optical packet generation unit, in which a variable optical attenuator is used, after detection of a failure in E/O of optical wavelength $\lambda_1$ in the first embodiment.

The adjustment of an optical output power is not limited to the method of directly controlling E/O as described above, but can also be achieved by a variable optical attenuator (VOA). FIG. 13 is a diagram for explaining operation of the optical packet generation unit 11, in which a variable optical attenuator 17-1 is used, after detection of a failure in E/O 118-1 of optical wavelength $\lambda_1$ in the first embodiment. As illustrated in FIG. 13, variable optical attenuators 17-0, 17-1, . . . , and 17-(M−1) are respectively disposed between each of E/Os 118-0, 118-1, . . . , and 118-(M−1) and the wavelength multiplexing unit 119. Each of the variable optical attenuators 17-0, 17-1, . . . , and 17-(M−1) adjusts an optical output power based on the transmission power control signal L12 input from the power calculation unit 120, so that an optical output power for each of wavelengths $\lambda_0$, $\lambda_2$ to $\lambda_{M-1}$ becomes B. That is, the optical packet generation unit 11 permits the variable optical attenuator 17-1 corresponding to the failed E/O 118-1 to be completely closed (shut down) using the transmission power control signal L12. At the same time, the optical packet generation unit 11 changes attenuation set value for each of the variable optical attenuators 17-0, 17-2, . . . , and 17-(M−1), so that the power output from each of other variable optical attenuators 17-0, 17-2, . . . , and 17-(M−1) becomes B.

Then, the optical transmission device 30 checks whether or not the optical packet P1 transmitted from the optical transmission device 10 as a transmission source can be normally recovered. When the check result indicates that the packet can be normally recovered, the optical transmission device 30 terminates transmission of the failure notification packet. On the other hand, when the check result indicates that the packet cannot be normally recovered yet, the optical transmission device 30 continues transmission of the failure notification packet.

As described above, the WDM transmission system 1 includes an optical transmission device 10, and another optical transmission device 30 that transmits and receives data to and from the optical transmission device 10. The optical transmission device 10 includes an N×N optical switch 13, an optical packet receiver 14 and an optical packet generation unit 11. The N×N optical switch 13 transmits data (for example, an optical packet P1) to the other optical transmission device 30. The optical packet receiver 14 detects change (for example, decrease at a failure, and increase at recovery) in the number of wavelengths (for example, 10) for optical signals constituting the above-described data. When the above-described change is detected by the optical packet receiver 14, the optical packet generation unit 11 generates data to be transmitted from the N×N optical switch 13 using optical signals for the number of wavelengths (for example, nine) after the change. The N×N optical switch 13 transmits the data generated by the optical packet generation unit 11, to the other optical transmission device 30. The other optical transmission device 30 separates the above-described data transmitted from the N×N optical switch 13 into a plurality of optical signals, and receives the separated optical signals.

In other words, when the optical transmission device 10 receives the failure notification packet P5, it recalculates the number of multiplexed wavelengths based on the wavelength configuration information in the main header H1 of the optical packet, and restructures the optical packet P1 in a format of an optical packet with normal wavelengths, enabling a main signal to be compensated.

Alternatively, the optical transmission device 10 may generate the above-described data by allowing the optical packet receiver 14 to detect lack of at least one optical signal among the above-described plurality of optical signals, and when the above-described lack of an optical signal is detected, permitting the optical packet generation unit 11 to multiplex wavelengths $\lambda_0$, and $\lambda_2$ to $\lambda_{M-1}$ other than the lacking wavelength $\lambda_1$. Furthermore, when the above-described change is detected by the optical packet receiver 14 in the optical transmission device 10, the optical packet generation unit 11 may generate data to be transmitted from the N×N optical switch 13 such that the optical output from the optical packet generation unit 11 is the same before and after the change.

Accordingly, even when a failure occurred in any E/O and an optical signal of a portion of the wavelengths is unable to be multiplexed and transmitted, the optical transmission device 10 can generate the optical packet using optical signals with the remaining normal wavelengths. Therefore, even when a failure occurred in the optical transmission device 10, the Ether packet E3 can be assembled in the optical transmission device 30 on a receiving side, enabling optical transmission to be continued constantly. As a result, reliability of the WDM transmission system 1 as well as the optical transmission device 10 improves.

Furthermore, in related systems, the number of wavelengths is not assumed to be changed. Therefore, a system optical level diagram is determined such that a packet error rate is minimized on the assumption of an optical packet with 10 wavelengths. The system optical level diagram is a diagram that indicates how nodes and switches to the destination of the optical packet set a strength (level) of each of the optical signals constituting the packet. However, since the optical transmission device 10 according to the present embodiment changes the number of wavelengths to prevent signal interruption, an optical output power is changed. As a result, the packet error rate is estimated to increase. According to the WDM transmission system 1 of the present embodiment, the optical transmission device 10 automatically controls an optical output power corresponding to each wavelength in accordance with the number of wavelengths used. Therefore, packet errors can be suppressed. Thus, high transmission quality is ensured. As a result, highly reliable transmission of an optical packet is enabled.

[b] Second Embodiment

The WDM transmission system 1 can be applied even when a failure occurred on the path of optical wavelength $\lambda_0$ to which the path information header is allocated. A second embodiment will be described. A WDM transmission system according to the second embodiment has the same configuration as the WDM transmission system according to the first embodiment illustrated in FIG. 1. Also, an optical transmission device according to the second embodiment has the same configuration as the optical transmission device according to the first embodiment illustrated in FIG. 2. Furthermore, an optical packet and a failure notification packet according to the second embodiment have the same configuration as the optical packet and the failure notification packet according to the first embodiment illustrated in FIG. 5A and FIG. 5B respectively. Therefore, in the second embodiment, the same reference sign is used for a component common to the first embodiment, and illustration and detailed description thereof are omitted.

The second embodiment differs from the first embodiment in terms of an optical wavelength in which abnormality occurred. Specifically, in the first embodiment in which a failure is assumed to have occurred in optical wavelength $\lambda_1$ without the path information header allocated, the optical transmission device 30 can refer to the path information header, and therefore can identify the optical transmission device 10 in which the failure occurred. On the other hand, in the second embodiment, a failure is assumed to have occurred in optical wavelength $\lambda_0$ with the path information header allocated. Hereinafter, operation of such a WDM transmission system 1 according to the second embodiment will be described with reference to FIG. 14 to FIG. 17, mainly focusing on differences from the first embodiment.

Next, operation of the WDM transmission system 1 according to the second embodiment will be described. The operation will be described based on an assumption that in the present embodiment, while an optical packet was transmitted from the optical transmission device 10 to the optical transmission device 30, a failure occurred in O/E 342-0 of the optical packet receiver 34 of the optical transmission device 30.

Figure 14:
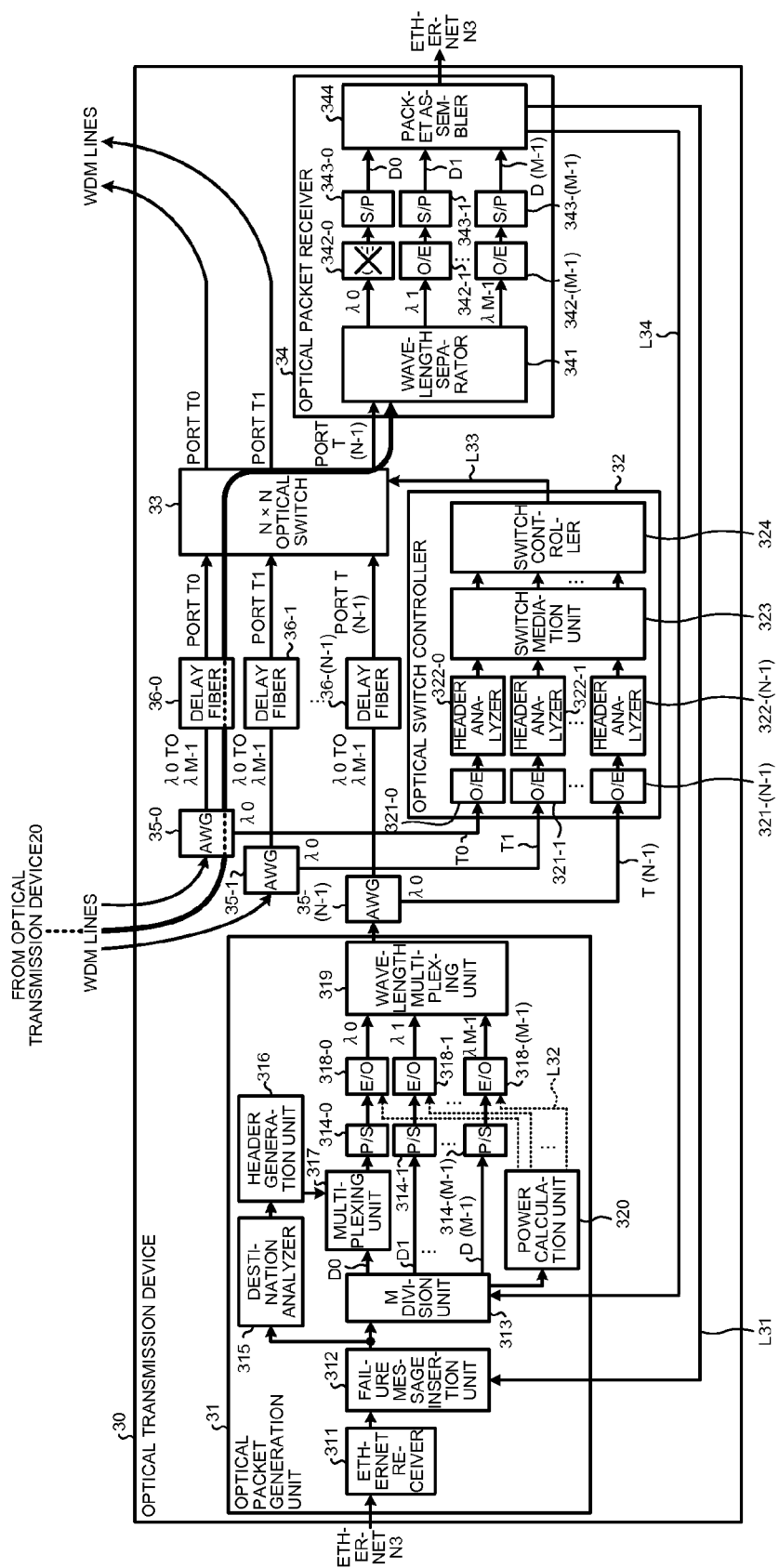
FIG. 14 is a diagram illustrating an optical transmission device before change of a header insertion wavelength when a failure occurred in O/E of wavelength $\lambda_0$ in a second embodiment.

FIG. 14 is a diagram illustrating the optical transmission device 30 before change of a header insertion wavelength in a case where a failure occurred in O/E 342-0 of wavelength $\lambda_0$ in the second embodiment. As illustrated in FIG. 14, the optical transmission device 30 receives an optical packet P1 transmitted from a relay optical transmission device 20 through a packet path R2. The packet assembler 344 of the optical packet receiver 34 attempts recovery of the received optical packet P1. However, when a failure occurred in O/E 342-0, which converts an optical signal of wavelength $\lambda_0$, due to any factor, the optical packet P1 cannot be recovered because of lack of the above-described optical signal.

Wavelength $\lambda_0$ corresponds to the path information header. An optical packet of wavelength $\lambda_0$ contains, as described above, path information such as a destination node ID and a transmission source node ID of the optical packet P1 (see FIG. 5A). For this reason, even when having received the optical packet P1, the optical transmission device 30 cannot identify the transmission source of the optical packet P1. Therefore, the optical transmission device 30 cannot transmit a failure notification packet to the transmission source node as in the first embodiment.

Figure 15:
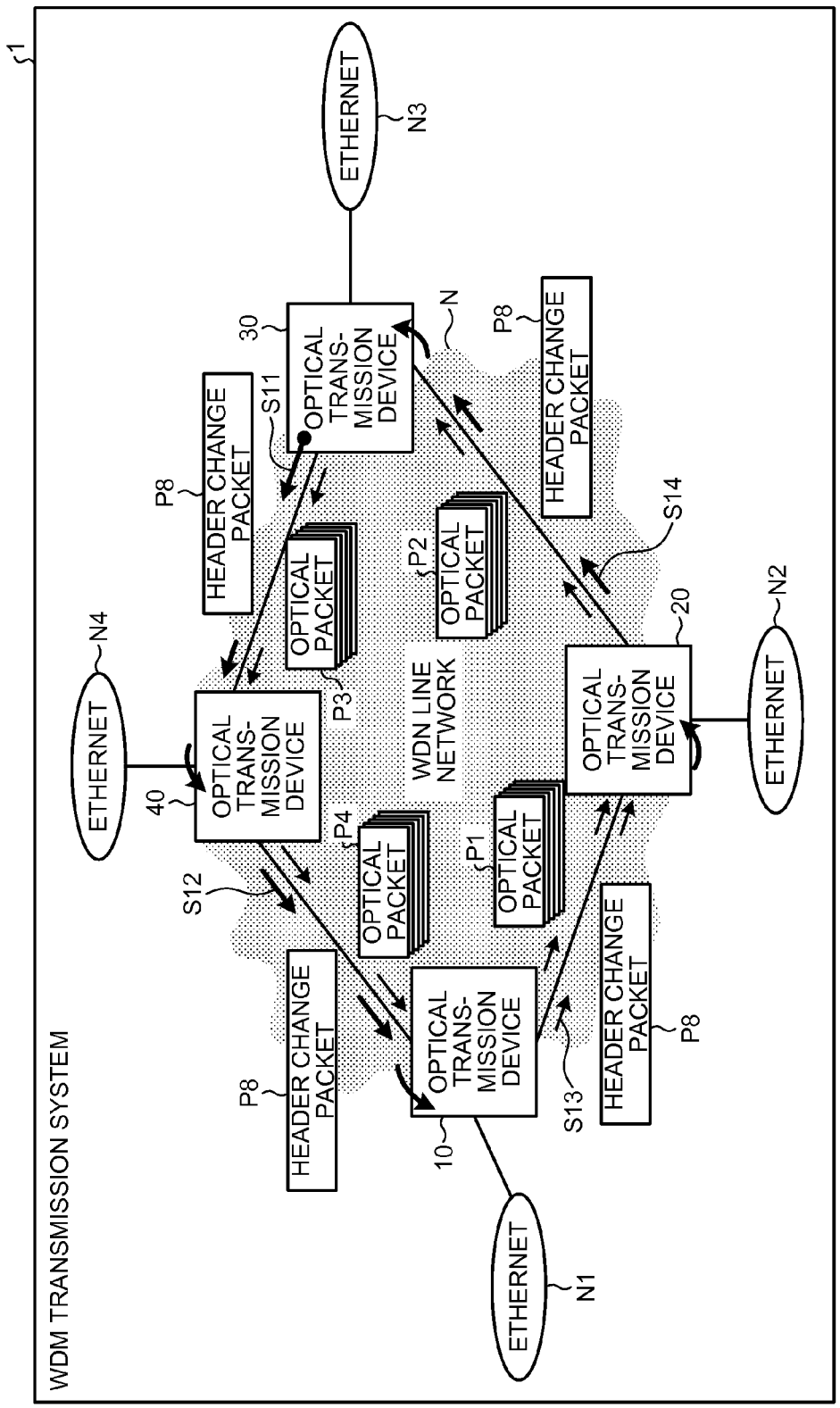
FIG. 15 is a diagram illustrating a state where the change of the insertion wavelength of a path information header is instructed in the second embodiment.

Therefore, when the path information header is not contained in the received optical packet P1, the optical packet receiver 34 of the optical transmission device 30 judges that wavelength 2 corresponding to the header is lacking, and thus detects abnormality of wavelength $\lambda_0$. FIG. 15 is a diagram illustrating a state where change of the insertion wavelength of the path information header is instructed in the second embodiment. As illustrated in FIG. 15, after the above-described abnormality detection, the N×N optical switch 33 of the optical transmission device 30 broadcasts a header change packet P8 to all of the optical transmission devices 40, 10, 20 and 30 on the WDM line (S11). After the header change packet P8 arrives at the optical transmission device 40, it is transferred to the optical transmission device 10 (S12), passes through the optical transmission device 20 (S13), and arrives at the optical transmission device 30 again (S14).

Each of the optical transmission devices 40, 10, 20 and 30 refers to the received header change packet P8, thereby to detect that the change of the insertion wavelength of the path information header was instructed. In the present embodiment, similarly to the first embodiment, the transmission source of the optical packet P1 is assumed to be the optical transmission device 10. Therefore, among the optical transmission devices 40, 10, 20 and 30 each having received the header change packet P8, the optical transmission device 10 becomes a node targeted by the above-described instruction. Therefore, the optical transmission device 10 changes the wavelength into which the path information header is to be inserted, from the original wavelength $\lambda_0$ to wavelength $\lambda_1$ according to the instruction of the header change packet P8. At the same time, the header insertion wavelength is also changed to wavelength $\lambda_1$ in the optical transmission devices 40, 20 and 30, enabling a header of an optical packet transmitted from the optical transmission devices 40, 20 and 30 as a transmission source to be referred to in the optical transmission device 30 on a receiving side.

Figure 16:
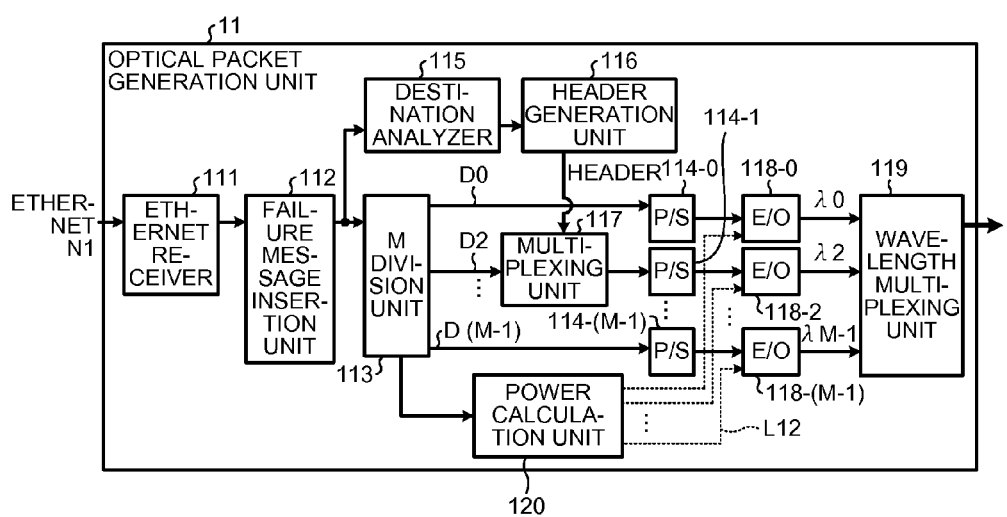
FIG. 16 is a diagram for explaining operation of an optical packet generation unit after the change of the header insertion wavelength in the second embodiment.

FIG. 16 is a diagram for explaining operation of the optical packet generation unit 11 after the change of the header insertion wavelength in the second embodiment. As illustrated in FIG. 16, the optical packet generation unit 11 includes a multiplexing unit 117 between P/S 114-1 corresponding to optical wavelength $\lambda_1$ and the M division unit 113. The multiplexing unit 117 inserts the path information header into a signal with wavelength $\lambda_1$. In FIG. 16, the optical packet generation unit 11 of the optical transmission device 10 is exemplarily illustrated. However, in the other optical transmission devices 40, 20 and 30, the wavelength of a signal for inserting the path information header is also changed from wavelength $\lambda_0$ to wavelength $\lambda_1$.

Figure 17:
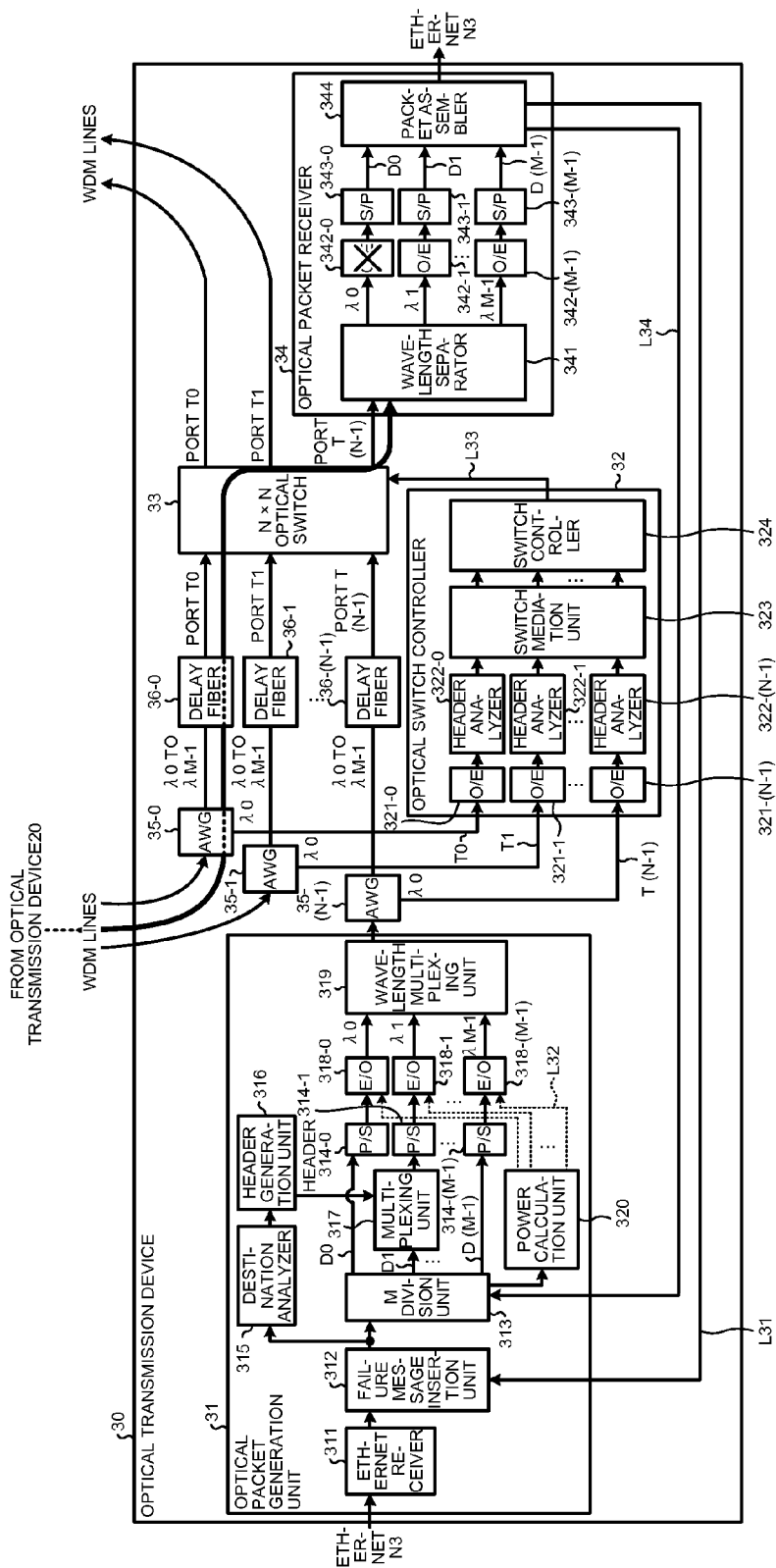
FIG. 17 is a diagram illustrating an optical transmission device after the change of the header insertion wavelength when a failure occurred in O/E of wavelength $\lambda_0$ in the second embodiment.

FIG. 17 is a diagram illustrating the optical transmission device 30 after the change of the header insertion wavelength in a case where a failure occurred in O/E 342-0 of wavelength $\lambda_0$ in the second embodiment. As illustrated in FIG. 17, at a time when the optical transmission device 30 newly received an optical packet P1 through the packet path R2, the position of the path information header in the optical packet P1 had been changed to wavelength $\lambda_1$. Therefore, the optical transmission device 30 can acquire information of the path information header from an optical signal of wavelength $\lambda_1$ using O/E 342-1 where a failure does not occur, when receiving the optical packet P1.

As described above, the optical transmission device 30 includes the optical packet receiver 34 and the N x N optical switch 33. The optical packet receiver 34 detects lack of an optical signal corresponding to the header of the above-described data among the above-described plurality of optical signals. When the lack of the optical signal is detected, the N×N optical switch 33 instructs the other optical transmission devices 10, 20 and 40 other than the optical transmission device 30 to change the wavelength of an optical signal to which the header is to be inserted. Therefore, the optical transmission device 30 can prevent communication interruption of the optical packet due to a wavelength failure, similarly to the first embodiment.

Here, in the above-described embodiments, a ring type is illustrated as a network form of the WDM transmission system 1. However, the network form is not limited to the ring type, and the embodiments discussed herein can be applied in other network forms such as a bus type, a star type, a tree type or a combination type thereof. Also, the number of optical transmission devices through which the optical packets P1 to P4 pass in the network is not limited to four, and may be five or more. Furthermore, a transmission distance from the optical transmission device 10 on a packet transmission side to the optical transmission device 30 on a packet receiving side, or a distance (device interval) between relay devices may have an optional value.

Also, in the above-described embodiments, an optical conversion module such as E/O and O/E is illustrated as an occurrence location of a device failure. However, the occurrence location is not limited to such an optical conversion module, and the embodiments discussed herein can be similarly applied even in a case where a failure occurred in other modules such as P/S and S/P. Furthermore, the failure occurrence location may not be one module. Even when failures occurred in a plurality of locations (for example, E/O 118-0 and P/S 114-1) at the same time, the embodiments discussed herein can be similarly applied. In other words, the embodiments discussed herein can be applied in a case of not only a failure in one wavelength but also failures in a plurality of wavelengths (for example, nine wavelengths).

Regarding the detection method of a failure, in the above-described embodiments, an aspect in which the optical transmission device 10 detects failure occurrence in its own device by notification from the other optical transmission device 30 has been illustrated. However, no limitation is made to such an aspect, and the optical transmission device 10 may detect the above-described failure occurrence by its own detection function.

Also, in the above-described first embodiment, a case in which a failure occurred in wavelength $\lambda_1$ other than the path information header in the optical transmission device 10 on a transmission side has been described. However, the embodiments discussed herein can be similarly applied to a case in which a failure occurred in wavelength $\lambda_1$ other than the path information header in the optical transmission device 30 on a receiving side (a receiving station). Similarly, in the second embodiment, a case in which a failure occurred in wavelength $\lambda_0$ of the path information header in the optical transmission device 30 on a receiving side has been described. However, the embodiments discussed herein can be similarly applied to a case in which a failure occurred in wavelength $\lambda_0$ of the path information header in the optical transmission device 30 on a transmission side (a transmission station).

The optical transmission technology according to the above-described embodiments can be applied to, for example, a system of dividing an IP (Internet Protocol) packet signal into a plurality of wavelengths to be transmitted and received as an optical burst signal. However, the above-described optical transmission technology can be applied to not only this system but also a system of transmitting and receiving a signal (for example, a time continuous signal) other than the optical burst signal.

Also, in the above-described embodiments, a case of occurrence of a failure has been described. However, the WDM transmission system 1 according to the present embodiment can be applied even in a case where recovery from a failure was achieved. That is, the optical transmission device 10 can correspond to not only decrease of the number of wavelengths of optical signals constituting the optical packet P1, but also increase thereof. For example, by a procedure in a reverse order of the above-described embodiments, the optical transmission device 10 may use optical wavelength $\lambda_1$, which was excluded after the occurrence of a failure, again to structure the optical packet P1 after the recovery. Accordingly, the optical transmission device 10 enables the optical packet P1 to restore a state before the occurrence of a failure. As a result, flexibility of the WDM transmission system 1 improves.

In the WDM transmission system 1 according to the second embodiment, the optical transmission device 30 is configured to broadcast an instruction to change a header insertion wavelength when a failure occurred in optical wavelength $\lambda_0$ corresponding to the path information header. However, the wavelength to be changed is not limited to the wavelength of the path information header. That is, the optical transmission device 30 may be configured to change the wavelength even when abnormality occurred in a wavelength having particularly high priority other than the wavelength of the header. For example, even when abnormality occurred in the optical wavelength (for example, wavelength $\lambda_{M-1}$) to which particularly important data such as a failure message is scheduled to be inserted, the optical packet receiver 34 of the optical transmission device 30 may be configured to change the wavelength to which the above-described data is to be inserted, to a new wavelength (for example, wavelength $\lambda_{M-2}$). Accordingly, the important data contained in the optical packet is inhibited from failing to be transmitted. Thus, the data reliably arrives at the optical transmission device as a destination. As a result, reliability of the WDM transmission system 1 improves.

Also, in the second embodiment, a wavelength after change may be previously determined. For example, the WDM transmission system 1 previously sets priority of a wavelength to be used after change, such that when wavelength $\lambda_0$ cannot be used, wavelength $\lambda_1$ is used, and when wavelength $\lambda_{M-1}$ cannot be used, wavelength $\lambda_0$ is used. Alternatively, the WDM transmission system 1 may set the order of change of a wavelength in the ascending or descending order of identification number. In any of the above-described aspects, the WDM transmission system 1 shares a previously set wavelength after change among the optical transmission devices 10, 20, 30 and 40, enabling smooth transition of the path information header and the like among wavelengths.

Furthermore, in the second embodiment, a wavelength after change may be sequentially specified. For example, the optical transmission device 30 may allow the header change packet P8 to contain information on a wavelength after change (for example, wavelength $\lambda_2$), so as to notify each of the optical transmission devices 10, 20 and 40 of the wavelength after change every failure occurrence. Accordingly, more environmentally adaptable wavelength change is enabled. Here, the wavelength to be changed is not limited to one wavelength, but may be two or more. Thus, even when failures concurrently occurred in a plurality of O/Es, response can be easily made.

Also, each component of the WDM transmission system 1 may not be physically configured as illustrated in the drawings. That is, a specific aspect of dispersion and integration of devices is not be limited to those illustrated in the drawings, and all or a part of the devices may be configured so as to be functionally or physically dispersed and integrated on an optional unit depending on various loads, use circumstances and the like. For example, the destination analyzer 115 and the header generation unit 116 of the optical packet generation unit 11, or the switch mediation unit 123 and the switch controller 124 of the optical switch controller 12 may be individually integrated as one component. Conversely, the N×N optical switch 13 of the optical transmission device 10 may be dispersed to provide a portion of on/off-controlling an SOA and a portion of sorting an optical packet into each port. Also, the packet assembler 144 of the optical packet receiver 14 may be dispersed to provide a portion of assembling and sending out an Ether packet E1 (packet assembling function) and a portion of notifying the optical packet generation unit 11 of a detected failure (failure notification function). Furthermore, a memory as a storage unit of various data and packets may be configured to be connected as an external device of the optical transmission device or an external device of the WDM transmission system through networks and cables.

Furthermore, in the above description, a separate configuration and operation have been described for each embodiment. However, the WDM transmission system according to each embodiment may include another component particular to another embodiment or variation in combination. For example, the optical output power adjustment function of the first variation is not limited to the first embodiment, and may be applied to the WDM transmission system 1 according to the second embodiment.

According to one aspect of the optical transmission device disclosed herein, even when a failure occurred in the optical transmission device, transmission of data can be continued.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmission device comprising:
a transmission unit that transmits data including a plurality of optical signals each including a different wavelength, the plurality of optical signals being multiplexed;
a detection unit that detects change in a number of wavelengths of optical signals constituting the data;
a generation unit that, when the change is detected by the detection unit, generates data to be transmitted by the transmission unit, using the optical signals for the number of wavelengths after the change; and
a mediation unit that performs mediation of the data by obtaining or discarding each of electrical signals input from header analyzers that analyze a path of the data in accordance with arriving order of the electrical signals.

2. The optical transmission device according to claim 1, wherein
the detection unit detects lack of at least one optical signal among the plurality of optical signals, and
the generation unit, when the lack of the optical signal is detected, multiplexes optical signals with wavelengths other than a wavelength of the lacking optical signal to generate the data.

3. The optical transmission device according to claim 2, wherein
the detection unit detects lack of an optical signal corresponding to a header of the data, among the plurality of optical signals, and
the transmission unit, when the lack of the optical signal is detected, instructs another optical transmission device other than the optical transmission device, to change a wavelength of an optical signal into which the header is to be inserted.

4. The optical transmission device according to claim 1, wherein the generation unit, when the change is detected by the detection unit, generates data to be transmitted by the transmission unit, such that an optical output from the generation unit becomes identical before and after the change.

5. An optical transmission system comprising an optical transmission device and another optical transmission device that transmits and receives data to and from the optical transmission device,
the optical transmission device including:
a transmission unit that transmits data including a plurality of optical signals each including a different wavelength to the other optical transmission device as a destination, the plurality of optical signals being multiplexed;
a detection unit that detects change in a number of wavelengths of optical signals constituting the data;
a generation unit that, when the change is detected by the detection unit, generates data to be transmitted by the transmission unit, using the optical signals for the number of wavelengths after the change; and
a mediation unit that performs mediation of the data by obtaining or discarding each of electrical signals input from header analyzers that analyze a path of the data in accordance with arriving order of the electrical signals,
wherein the transmission unit transmits data generated by the generation unit to the other optical transmission device as the destination, and
the other optical transmission device includes a receiver that receives the data transmitted by the transmission unit.

6. An optical transmission method comprising:
transmitting data including a plurality of optical signals each including a different wavelength, the plurality of optical signals being multiplexed;
detecting change in a number of wavelengths of optical signals constituting the data;
generating, when the change is detected, data targeted at the transmission, using the optical signals for the number of wavelengths after the change; and
performing mediation of the data by obtaining or discarding each of electrical signals input from header analyzers that analyze a path of the data in accordance with arriving order of the electrical signals.

* * * * *